United States Patent

[11] 3,583,129

[72] Inventor Donald R. Rorer
 Lake Bluff, Ill.
[21] Appl. No. 872,111
[22] Filed Oct. 29, 1969
[45] Patented June 8, 1971
[73] Assignee Stone Container Corporation
 Chicago, Ill.

[54] AUXILIARY AIR-EVACUATING APPARATUS FOR CONTINUOUS SKIN-PACKAGING MACHINE
 11 Claims, 3 Drawing Figs.
[52] U.S. Cl. .................................................... 53/112A
[51] Int. Cl. ..................................................... B65b 31/00
[50] Field of Search ........................................... 53/112

[56] References Cited
 UNITED STATES PATENTS
 2,633,684 4/1953 Rohdin ........................ 53/112

Primary Examiner—Travis S. McGehee
Attorney—Silverman and Cass

ABSTRACT: An auxiliary air-evacuating apparatus for a continuous skin-packaging machine in which separate air-evacuating means are operable concurrently with the vacuum-forming station of the machine. The air-evacuating means is operable in a chamber formed upstream of the station considering the direction of movement of package-forming materials through the machine. Further, said means is operable concurrently with the vacuum-forming station to effectively and controllably reduce the air pressure in said chamber by reducing the quantity of air trapped between the film and substrate packaging materials thereby reducing the quantity of air to be removed when the skin packages are formed at said vacuum station. A material increase in production of the continuous skin-packaging machine is thereby realized without attendant increase in capacity of the air-evacuating apparatus at said station.

PATENTED JUN 8 1971 3,583,129
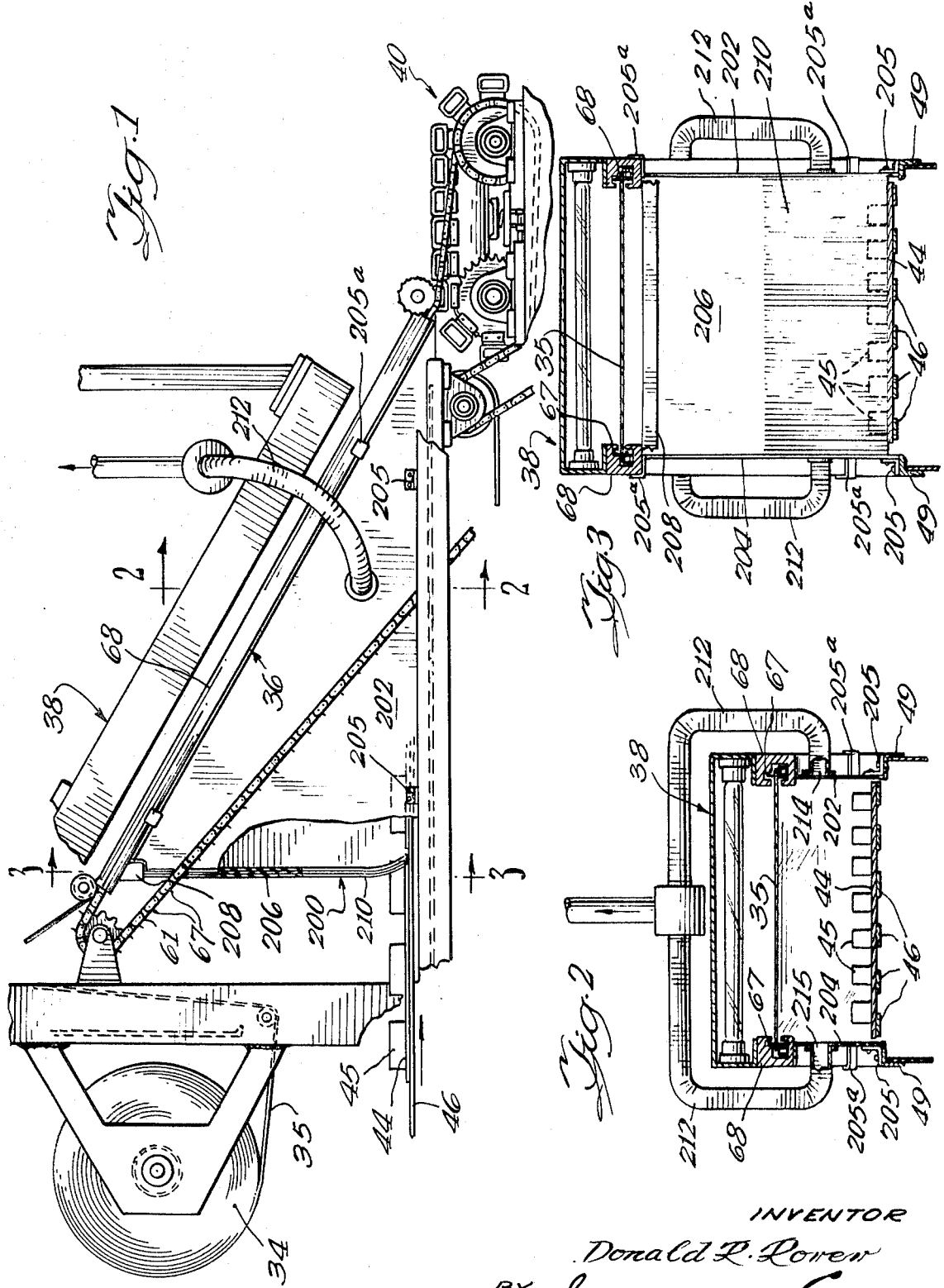
INVENTOR
Donald R. Rowen
BY Silverman & Cass
ATTORNEYS

AUXILIARY AIR-EVACUATING APPARATUS FOR CONTINUOUS SKIN-PACKAGING MACHINE

FIELD OF THE INVENTION

This invention relates generally to a packaging machine for continuously making so-called skin packages wherein a carded article is encased in a thin film of thermoplastic material laminated to the card or substrate and more particularly, to a novel auxiliary air-evacuating apparatus for a continuous skin-packaging machine operable concurrently with the vacuum-forming station of such machine.

The machine to which this invention applies is of the type described and disclosed in the copending patent application Ser. No. 826,604 filed May 21, 1969 for Continuous Skin-Packaging Machine and Method. This copending patent application is owned by the same assignee as the herein application and is incorporated herein as a part hereof by specific reference.

BACKGROUND OF THE INVENTION

The continuous skin-packaging machine of the copending application transports a web of thermoplastic film and substrate material continuously to a vacuum-forming station. Prior to its arrival at said station, the film has been heated to its forming temperature. As the heated film and substrate traverse the station, a vacuum is drawn on the underside of the substrate so that the film will be collapsed around the carded articles and laminated to the substrate to produce skin packages which thereafter are ejected for further trimming thereof, if desired.

More specifically, the continuous skin-packaging machine includes a linearly movable conveyor, having an entrance end and an exit end, for transporting package substrate material bearing the articles to be packaged in a direction toward a vacuum-forming station. The vacuum-forming station is in line with the conveyor, spaced from the exit end thereof, and has a linearly movable vacuum bed which is substantially flush with the level of the conveyor and in parallel registry with the direction of movement thereof. The web of thermoplastic film is supported and transported above the conveyor at an acute angle relative to the plane of the conveyor. The film transport system is provided with film infeed and discharge ends, with the discharge end being in close proximity to the exit end of the conveyor and closer to the conveyor than the infeed end. As the film is transported from the infeed end to the discharge end it is heated by a heater assembly supported above the film to a temperature at which it can be vacuum-formed. The conveyor is controlled to discharge the substrate to the vacuum-forming station synchronously with the heated film being discharged from the film transport means.

The vacuum forming station has a vacuum bed which is continuously subjected to evacuation so as to continuously draw the heated film down over the substrate as it is being moved linearly on the vacuum bed. For a more complete description of this machine, reference can be had to the aforementioned copending patent application.

The efficiency of such machines in terms of their production capacity per unit of time will depend, in substantial measure, upon the efficiency of the vacuum-forming apparatus. Heretofore, it has been determined that to increase efficiency in this context, it is necessary to enlarge the vacuum-forming means or increase its vacuum-drawing capacity. This same determination has been relied upon for improving production of the skin packages of increasing size. The solution to this problem is additionally complicated by the nature of the substrate which must be air-permeable, either naturally or by virtue of implanted perforations so that a vacuum could be drawn therethrough. Obviously, in many applications, implanting perforations in the substrate either is not feasible or the size thereof must be of immediate concern to the packager. Finally, there are practical limitations in the size the vacuum-forming apparatus can be increased which will be readily apparent to the skilled artisans.

Further complicating the problem is the fact that regardless of the size of the vacuum-drawing apparatus at the forming station, the permeable character of the substrate will limit the amount and speed of vacuum drawn and hence, the speed or rate of production of the machine. Also, too fast or low of a draw can rupture softened or heated film in the laminating process.

SUMMARY OF THE INVENTION

To resolve the aforesaid problems, there is provided an auxiliary air-evacuating system in a continuous skin-packaging machine operative to evacuate air between the heated film and the substrate from a location above the substrate and concurrently with evacuation of air from below the substrate by the vacuum-forming apparatus of the machine. An enclosed wedge-shaped chamber is formed which includes as surfaces thereof, the film transported below the heater assembly of the machine, the substrate moving on the conveyor below the heater hood and an entry curtain normal to the conveyor. Said auxiliary means is operative to evacuate said chamber selectively so as to reduce the amount of air between the heated film and substrate when these materials enter the vacuum-forming station. The reduction in quantity of air trapped between the film and substrate during vacuum-forming reduces the load imposed on the vacuum-forming apparatus and increases the rate of production of the machine to an unexpected degree.

An important object of the invention is to provide auxiliary air-evacuating means of the character described which can easily and readily be installed without modification of the existing continuous machine of said copending application to any significant extent.

Another object of the invention is to provide such auxiliary air-evacuating apparatus which is very economical to install and use.

DESCRIPTION OF THE DRAWING

FIG. 1 is a fragmentary side elevational view, with portions removed, of the skin-packaging machine of said copending application and showing the auxiliary air-evacuating apparatus embodying the invention operatively installed thereon.

FIG. 2 is a fragmentary sectional view taken along line 2-2 of FIG. 1 and in the direction indicated generally.

FIG. 3 is a fragmentary sectional view taken along line 3-3 of FIG. 1, and showing the curtain wall at the entry end of the chamber.

DESCRIPTION OF THE PREFERRED EMBODIMENT

In the following description wherever possible, elements which are identical to those disclosed in the aforementioned copending application have been given the same names and reference numerals; generally reference numerals 200 and above depict elements and parts thereof not disclosed in said copending application.

Referring now to the drawings, in FIG. 1, reference numeral 200 generally depicts an enclosed wedge-shaped chamber which comprises a portion of the auxiliary air evacuating means. The web of thermoplastic film 35 being transported to the vacuum-forming station 40 through the film-transporting means, generally 36, forms the upper surface of the chamber 200. The sidewalls of the chamber are formed by two vertically disposed and triangularly shaped members 202 and 204. These members 202 and 204 abut the film guideways 68 along the members upper edge and the longitudinally extending stringers 49 along the members lower edge to help define a generally closed chamber 200 sufficient for the purposes of this invention.

The walls 202 and 204 are located and secured in place by means of flanges 205 and 205a projecting from the walls. Flanges 205 are adapted to be secured to the stringers 49. The flanges 205a may have a right angle end portion to engage the outward facing surface of the guideways or stringers for locating purposes.

Conveyor belts 46, transport the base pad 44, on which the articles 45 to be packaged are carded, to the vacuum-forming station 40. Thus, the conveyor and the base pad form the floor of the chamber.

The chamber is completed by a curtain wall 206, seen in FIG. 3, which is disposed across the entry end of the chamber. This curtain wall 206 includes a support bar 208 and a series of contiguous depending strips 210 of material. The curtain is secured at its upper end to the support bar 208 and the lower ends of the strips 210 are adjacent the floor of the chamber. Curtain walls as described herein are known in the art and may be selected from those currently available. The principal requirements for the curtain wall are that articles 45 which have been placed on the base pad 44 can be transported through the curtain wall without disturbing their position on the pad and that the curtain wall will return to its original position while preventing the entry of substantial quantities of air thereby, for the purposes of this invention, sealing the entry end of chamber. In other words, the shredded lower part of the curtain wall will allow movement of carded articles therethrough and yet maintain the reduced pressure within the chamber. The exit end of the wedge-shaped chamber is formed by the convergence of the thermoplastic film 35 and the base pad 44. The exit end is coincident with the end of the film transport means 36. This point of coincidence is adjacent and upstream of the vacuum-forming station 40.

Air is removed from the wedge-shaped chamber by providing paths of communication between the interior of the chamber and operative air-evacuation means. Evacuation means for use with this invention are well known in the art and can comprise vacuum turbines, vacuum pumps and tanks, etc. Communication between the air-evacuating means and the wedge-shaped chamber is provided by virtue of evacuation lines 212 which engage evacuation apertures 214 and 215 in the sidewalls 202 and 204 respectively. It is preferred to use at least two evacuation lines, one connected to each side of the chamber and at points opposite one another. Certainly, if it is desired, more than two evacuation lines can be used. It should also be noted that the evacuation lines can be located anywhere in the sidewalls but that it is preferred to connect them to the chamber in the downstream portion of the sidewalls near the exit end of the chamber. This preference is based upon the need to maintain a reduced pressure near the exit end of the wedge-shaped chamber 200 so as to assure the reduction in the quantity of trapped air upon entry of the substrate and film to the vacuum station.

The air evacuating means for use in the auxiliary air-evacuating system is separate from the air-evacuating means used with the vacuum-forming station. For purposes of operation, it is preferred to maintain two separate air evacuation systems although, if necessary and with the proper valve arrangements, a single air-evacuating means could be used for both the vacuum station and the auxiliary air evacuation apparatus.

The film transport system, substrate transport system, heater system, and vacuum-forming station, used in this invention are identical with and operate in the same manner as the systems disclosed in the aforementioned copending application. In operation, a web of thermoplastic film is drawn from a reel 34 through guideways 68 by means of a chain 61 having film engaging tines 67. The film is transported beneath a heater assembly 38 so as to soften and prepare the film for lamination to the carded article (45). As the film is being transported and heated, the air pervious substrate 44 with an articled 45 carded thereon is transported beneath the film 35 and to the vicinity of the vacuum-forming station 40 whereat the heated film 35 and carded articled 45 converge.

In the present invention air is continuously withdrawn from between the film and base pad, and at a point above the pad. The removal of this air by the auxiliary evacuating system provides for a substantially increased rate of production since the quantity of air to be removed at the vacuum-forming station is reduced. Thus a smaller volume of air is required to be drawn through the substrate at the forming station, to effect lamination. The operation of the improved machine is essentially the same as with prior machines except that the carded article is transported on the conveyor through the entry curtain wall and into the evacuation chamber 200 prior to entering the forming station. As in the copending application, while the carded article is being transported to a point in proximity with the vacuum-forming station, the plastic film is being transported and heated so that it will be prepared for lamination to the carded article.

Once the heated film and carded article converge, they are transported to the vacuum-forming station where final evacuation and lamination occurs. The vacuum forming station used herein is fully described in structure and operation in the aforementioned copending application and reference should be made thereto.

Since the operation of the evacuation chamber 200 is continuous the auxiliary evacuation means is operable concurrently with the vacuum-forming station. However, appropriate control means can be provided for independent activation and deactivation of the air-evacuating means.

By virtue of the above-described auxiliary air-evacuating means the capacity or rate of production of the continuous skin-packing machines particularly that machine as described in the copending application, have been significantly and unexpectedly increased. Moreover, by virtue of the initial air evacuation less air pervious substrates can be used since a smaller quantity of air need be removed at the vacuum-forming station.

It will be appreciated that, although the preferred embodiment of this invention has been described in relation to the machine of the copending application, it is not limited thereto, since this invention can be used with other continuous skin-packaging machines.

What I claim to be secured by Letters Patent of the United States is:

1. In combination, a continuous skin-packaging machine having a linearly moving conveyor arranged to carry articles carded on a porous substrate to be continuously encased in a thin thermoplastic film by laminating heat-softened film to the substrate over the articles at a vacuum-forming station, the station having a vacuum platen and means for drawing a vacuum through the platen when said substrate is positioned thereon, an auxiliary air-evacuating apparatus located upstream of said vacuum-forming station considering the direction of travel of packaging materials through the machine, said apparatus including:

a. an evacuation chamber having a floor provided by said conveyor, a pair of sidewalls and an otherwise open end opposite the conveyor, said film being transported along the open end and the substrate being transported through the chamber on the conveyor along a horizontal plane of movement:

b. said chamber extending above the conveyor and having an exit end connecting with the entrance to said vacuum-forming station; and c. auxiliary means connected to said chamber for evacuating air from said chamber during such movement of the film and substrate so that the quantity of air in the chamber below the film is reduced prior to introducing the packaging materials to said vacuum-forming station from the chamber.

2. The combination as claimed in claim 1 wherein the upper end of the chamber is effectively closed by the film during operation of said auxiliary air-evacuating means.

3. The combination as claimed in claim 2 wherein the exit end of the chamber is at the point where film and substrate converge.

4. The combination as claimed in claim 1 wherein said chamber has an entry end upstream of the exit end, considering the direction of movement of the substrate, said entry end comprising a curtain wall disposed thereacross.

5. The combination as claimed in claim 4 wherein the chamber is wedge-shaped and has two vertically disposed triangular-shaped sidewalls.

6. The combination as claimed in claim 5 wherein the auxiliary air-evacuating means is operatively connected to the chamber at a point in a sidewall thereof proximate the exit end of the chamber.

7. The combination as claimed in claim 1 wherein the air-evacuating means is operatively connected to the chamber at a point above the conveyor.

8. The combination as claimed in claim 4 in which said curtain has a separable lower end for passage of carded articles therethrough.

9. An improved packaging machine for producing skin packages in a continuous sequence of operation including
 a. a linearly movable conveyor for transporting package substrate material carrying articles thereon in a direction toward a vacuum-forming station, said conveyor having an entrance end and an exit end,
 b. a vacuum-forming station in line with said conveyor and spaced from said exit end, said vacuum-forming station having a linearly movable vacuum bed substantially flush with the level of said conveyor and in parallel registry with the direction of movement of the conveyor,
 c. a thermoplastic film-transporting means supported above the conveyor at an acute angle relative to the plane of said conveyor, said film-transporting means having a film infeed end and a film discharge end, said film discharge end being closer to the conveyor than said infeed end and in close proximity to the exit end of the conveyor,
 d. a heater assembly supported above the film-transporting means for elevating the temperature of film traversing below the heater assembly to its vacuum-forming temperature,
 e. means for feeding a continuous web of said film into the infeed end of said film-transporting means,
 f. said conveyor constructed and arranged to discharge said package substrate material to said vacuum bed synchronized with the discharge of heated film from the discharge end of said film-transporting means,
 g. said vacuum bed being under a vacuum-drawing condition to continuously draw the heated film down over the articles and adhere same to the substrate material as said substrate material is moved linearly on said vacuum bed,
wherein the improvement comprises, an auxiliary air-evacuating apparatus, having;
 h. an evacuation chamber, through which the film and substrate pass, disposed between the conveyor and film-transporting means, said chamber having an exit end upstream of said vacuum-forming station,
 j. means for evacuating the chamber operatively connected thereto, so that the quantity of air in the chamber between the film and substrate is reduced,
 k. thereby reducing the quantity of air to be removed, from between the film and substrate, at the vacuum-forming station.

10. An apparatus as claimed in claim 9 wherein said chamber has an entry end upstream, with respect to the direction of movement of the substrate, of the exit end, said entry end comprising a curtain wall disposed thereacross.

11. An apparatus as claimed in claim 10 in which said curtain has a separable lower end for passage of carded articles therethrough.